United States Patent [19]
Robbins et al.

[11] Patent Number: 6,024,460
[45] Date of Patent: Feb. 15, 2000

[54] REMOTE MIRROR ADJUSTMENT MECHANISM

[75] Inventors: Norman B. Robbins, Davison; Craig A. Confer, White Lake, both of Mich.

[73] Assignee: Chrysler Corporation, Auburn Hill, Mich.

[21] Appl. No.: 09/113,859

[22] Filed: Jul. 10, 1998

[51] Int. Cl.⁷ .............................. G02B 7/182; F16C 1/10
[52] U.S. Cl. .......................................... 359/872; 74/502.1
[58] Field of Search ................................ 359/871, 882; 74/300.5, 502.1, 502.4, 502.5, 502.6

[56] References Cited

U.S. PATENT DOCUMENTS

| | | | |
|---|---|---|---|
| 3,650,606 | 3/1972 | VanNoord | 350/282 |
| 3,655,273 | 4/1972 | Pringle | 350/281 |
| 3,712,149 | 1/1973 | VanNoord | 74/501 M |
| 3,719,105 | 3/1973 | Horwitt et al. | 74/501 |
| 3,780,598 | 12/1973 | Menger | 74/501 M |
| 3,934,489 | 1/1976 | Bottrill | 74/501 M |
| 4,072,065 | 2/1978 | Perrella | 74/502 |
| 4,197,762 | 4/1980 | Yamana | 74/501 M |
| 4,213,675 | 7/1980 | Pilhall | 350/307 |
| 4,315,113 | 2/1982 | Fisher et al. | 200/5 R |
| 4,357,076 | 11/1982 | Manzoni | 350/307 |
| 4,372,177 | 2/1983 | Yamana | 74/501 M |
| 4,411,403 | 10/1983 | Tomsu | 248/575 |
| 4,636,045 | 1/1987 | Suzuki | 350/606 |
| 4,755,033 | 7/1988 | Whitehead et al. | 350/635 |
| 4,783,161 | 11/1988 | Shamoto | 350/635 |
| 4,816,662 | 3/1989 | Kyoden | 200/5 R |
| 4,828,361 | 5/1989 | Alten et al. | 350/279 |
| 4,889,308 | 12/1989 | Gillet | 248/485 |
| 5,600,497 | 2/1997 | Leonberger | 359/875 |

FOREIGN PATENT DOCUMENTS

| | | | |
|---|---|---|---|
| 2258296 | 7/1973 | Germany | 359/875 |
| 2914804 | 10/1979 | Germany | 359/875 |

*Primary Examiner*—Cassandra Spyrou
*Assistant Examiner*—Jared Treas
*Attorney, Agent, or Firm*—Kenneth H. Maclean

[57] ABSTRACT

A remote mirror adjustment mechanism for manually adjusting the position of a vehicle side rear-view mirror wherein the adjustment mechanism has a base member having an annular edge for engaging and mounting the adjustment mechanism to a substantially flat interior panel of the vehicle and forming a recessed space in the panel. The base member includes a concave socket for rotatably receiving a ball socket there against. An elongated arm member is mounted to the ball socket and biased from an actuation position with the arm member extending outwardly from the recessed space and beyond the annular edge to a rest position retracted in the recessed space and below the annular edge. A plurality of cables interconnect the ball socket and the side rear-view mirror to provide angular adjustment of the mirror when the arm member rotates the ball socket in the actuation position. A housing defining a cavity encloses the ball socket against the concave socket of the base member. The arm member is biased to the rest position to prevent accidental miss-adjustment of the side rear-view mirror by the vehicle operator.

3 Claims, 3 Drawing Sheets

6,024,460

REMOTE MIRROR ADJUSTMENT MECHANISM

FIELD OF THE INVENTION

The subject invention relates to a remote mirror adjustment mechanism for manually adjusting the position of a vehicle side rear-view mirror.

BACKGROUND OF THE INVENTION

Automotive vehicles typically include either power or manual remote control mechanisms for adjusting a vehicle side rear-view mirror mounted outside of the passenger compartment, such as on the front door panel, from the interior of the vehicle. The manual control mechanisms commonly use sheathed cables which are routed through the door panel between the control mechanism and the mirror to adjust the horizontal and vertical, or angular, position of the mirror. The control mechanism is most commonly mounted to the interior panel of the door to facilitate easy routing of the cables to the mirror and to eliminate interference with the vehicle operator or passenger compartment area.

Typical examples of such manual remote control mirror adjustment mechanisms are exemplified in U.S. Pat. No. 3,712,149 to Van Noord, issued Jan. 23, 1973 and U.S. Pat. No. 4,372,177 to Yamana, issued Feb. 8, 1983. Each of these references include a manual control mechanism connected to the side rear-view mirror by a plurality of cables to adjust the angular position of the mirror from the vehicle interior compartment. The control mechanism includes a base member supporting a pivotal elongated arm which is connected to some form of joint member to alter the longitudinal length of the cables and adjust the position of the mirror. The arm member extends beyond the outer perimeter of the base member from the interior panel to provide access to the operator for adjustment and provide ample range of pivotal movement relative to the base for adjustment of the mirror.

However, it is becoming increasing common to design more stylistic and thin profile interior door panels and interior compartments. The door panel often does not provide adequate surface area or thickness for the mounting of the mirror adjustment mechanism and the routing of the cables through the door panel is becoming increasingly difficult. Therefore, it is desirous to provide alternative areas on the panels within the vehicle interior compartment for mounting of the mirror adjustment mechanism and/or alternative adjustment mechanisms capable of accommodating the limited area for mounting on the door panels or other interior panels. One problem which must be overcome with placing and mounting the adjustment mechanism is the protrusion of the elongated arm member extending from the base member of the mechanism into the interior compartment. The protrusion of the arm member away from the surface of the interior panel makes the adjustment mechanism susceptible to incidental miss-adjustment by being knocked out of adjustment by the operator or passenger.

Therefore, the object of the present invention is to provide a remote mirror adjustment mechanism which may be mounted to a variety of interior panels and allow the arm member for manually adjusting the side rear-view mirror to remain recessed in the mechanism or panel when not in use to prevent accidental miss-adjustment of the mirror.

SUMMARY OF THE INVENTION

A remote mirror adjustment mechanism for manually adjusting the position of a vehicle side rear-view mirror comprises a base member having a first end defining an annular edge adapted to engage and mount the adjustment mechanism to a substantially flat interior panel of a vehicle and a second end defining a bottom surface. The base member forms a recessed space extending between the annular edge and the bottom surface. The adjustment mechanism includes an elongated arm member mounted to the base member and moveable between a first rest position with the arm retracted in the recessed space and a second actuation position with the arm extending outwardly from the recessed space and beyond the annular edge for manually adjusting the position of the vehicle side rear-view mirror.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
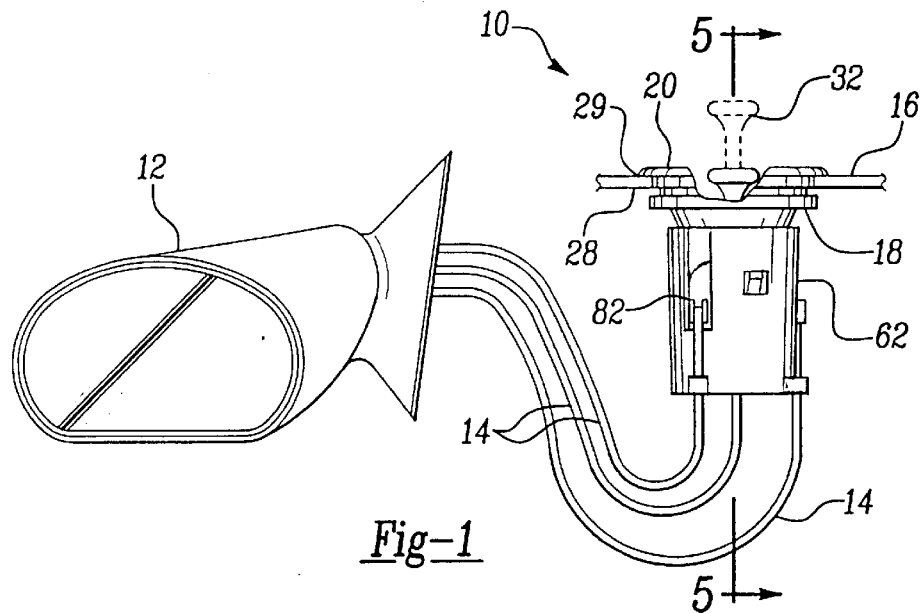
FIG. 1 is a partially broken perspective view of the remote mirror adjustment mechanism and the vehicle side rear-view mirror.

Referring to the Figures, wherein like numerals indicate like or corresponding parts throughout the several views, a remote mirror adjustment mechanism is generally shown at 10 for manually adjusting the position of a vehicle side rear-view mirror 12 as shown in FIG. 1. The side rear-view mirror 12 is typically secured to the exterior door panel of the vehicle for providing rear and side views to the driver of the vehicle. It is necessary to adjust the angular position of the mirror 12 for different drivers for proper rear and side viewing. The adjustment of the mirror 12 may be power, such as electrical, or manual, such as by a remote mirror adjustment mechanism 10 connected to the mirror 12 via a plurality of pull-pull Bowden type sheathed cables 14. The remote mirror adjustment mechanism 10 is secured within the interior compartment of the vehicle to facilitate convenient adjustment of the exterior side rear-view mirror 12. The preferred embodiment of the subject invention discloses a remote mirror adjustment mechanism which may be mounted to an interior panel, as shown at 16 in FIG. 1, within the interior compartment of the vehicle, while mitigating protrusion of the adjustment mechanism from the panel 16 to prevent incidental miss-adjustment of the mirror 12.

The remote mirror adjustment mechanism 10 of the preferred embodiment includes a generally oval or elliptical shaped base member 18 having a first end defining an annular edge 20 adapted to engage and mount the adjustment mechanism 10 to the substantially flat interior panel 16 of the vehicle. The base member 18 may be any size or shape as desired or necessary for styling and configuration on the interior panel 16. The base member 18 further includes a second end defining a bottom surface 22 and a recessed space 24 is formed by the base member 18 extending between the annular edge 20 and the bottom surface 22. The bottom surface 22 is smaller in dimension than the perimeter of the annular edge 20 and an angled base wall 26 is interconnected there between to further define the recessed space 24.

Figure 3:
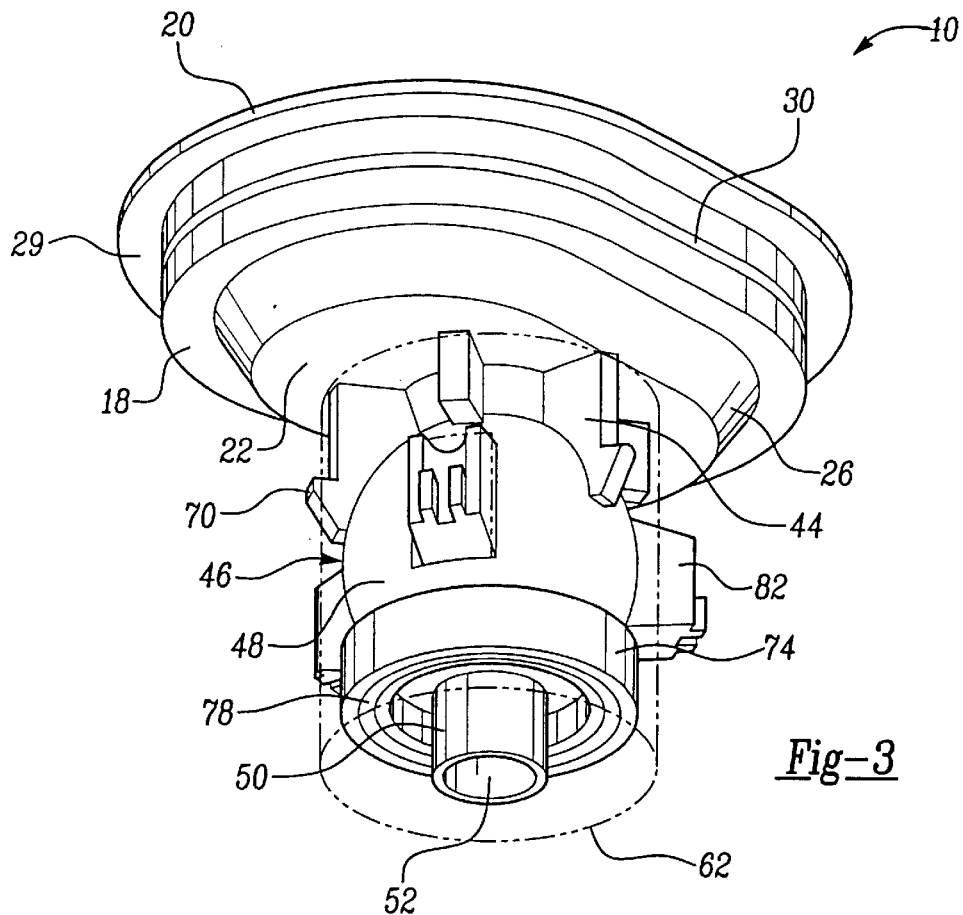
FIG. 3 is a bottom perspective view of the remote mirror adjustment mechanism with the housing shown in phantom.
Figure 5:
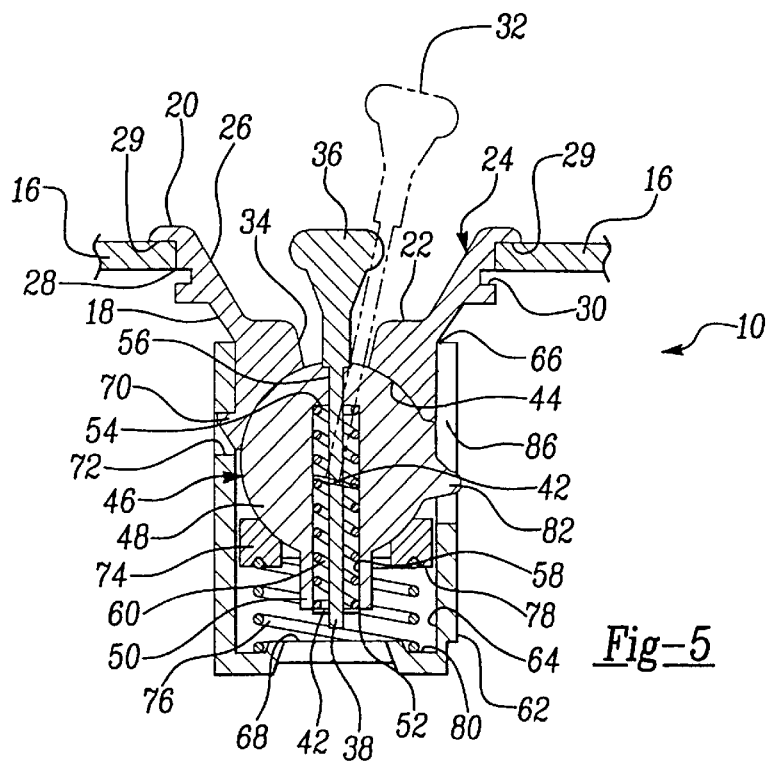
FIG. 5 is a cross-sectional view of the remote mirror adjustment mechanism taken along line 5—5 of FIG. 1 with the arm member shown in phantom in the actuation position.

Referring to FIGS. 1, 3, and 5, the adjustment mechanism 10 is received in an opening 28 in the interior panel 16. The annular edge 20 extends outwardly from the base wall 26 to form a lip 29 to receive and cover a peripheral edge formed by the opening 28 in the interior panel 16. The exterior surface of the base wall 26 includes a channel or notch 30 spaced below the lip 29 for receiving a retaining ring for securing the edge of the panel 16 against the lip 28.

Figure 2:
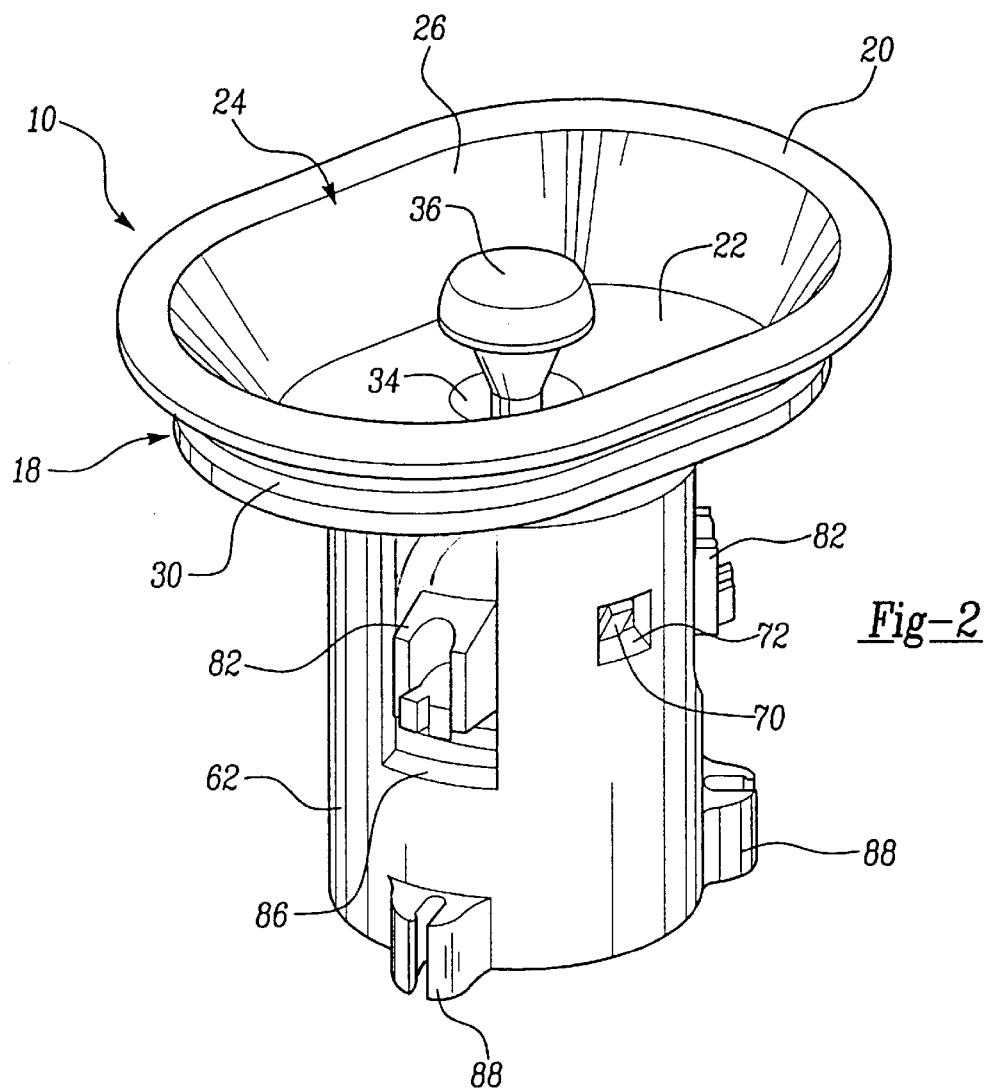
FIG. 2 is a top perspective view of the remote mirror adjustment mechanism in the rest position.

As shown in FIGS. 1, 2, 4, and 5, the remote mirror adjustment mechanism 10 further includes an elongated arm member 32 mounted to the base member 18 and moveable between a first rest position with the arm 32 retracted in the recessed space 24, as shown in FIG. 2, and a second actuation position with the arm 32 extending outwardly from the recessed space 24 and beyond the annular edge 20, as shown in phantom in FIG. 5, for manually adjusting the position of the vehicle side rear-view mirror 12. The base member 18 includes an aperture 34 extending through the bottom surface 22 for moveably receiving the arm member 32 between the rest and actuation positions. The arm member 32 includes a first distal end forming a control knob 36, an elongated shaft 38, and a second distal end having a groove 40 for receiving a pushnut 42 as will be described in detail herein below.

Figure 4:
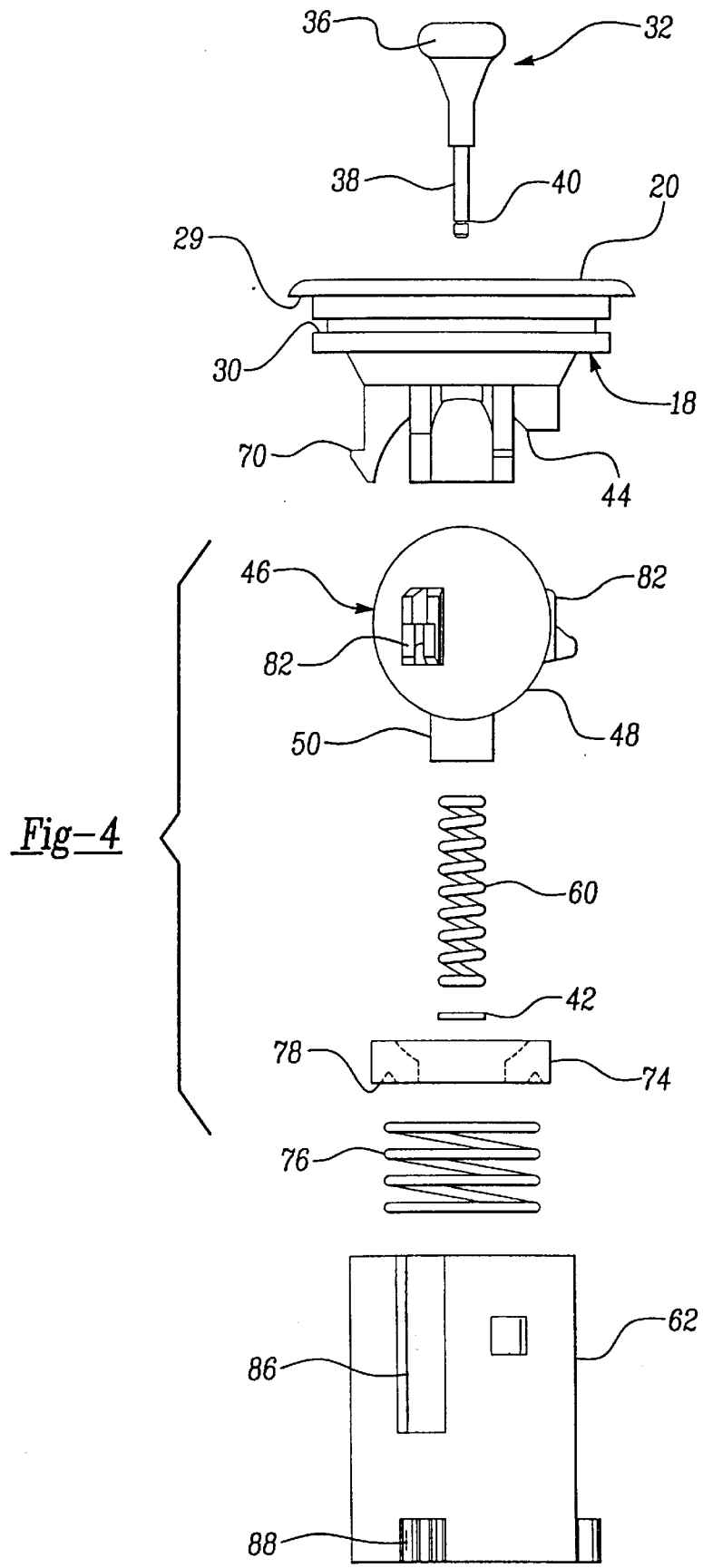
FIG. 4 is an exploded view of the remote mirror adjustment mechanism.

As shown in FIG. 4, the second end of the base member 18 further includes a concave socket 44 for receiving a rotatable ball socket 46 there against and below the bottom surface 22 of the base member 18. The ball socket 46 includes a generally spherical ball portion 48 and a cylindrical collar 50 extending downwardly from the ball portion 48 as shown in FIGS. 3 and 4. The ball socket 46 includes a center bore 52 extending through the spherical ball portion 48 and the collar 50 for receiving at least a portion of the elongated arm member 32 there through. The center bore 52 is counter set between the top of the spherical ball portion 48 and the collar 50 to form an end wall 54 within the spherical ball portion 48. That is, the center bore 52 includes a first upper section 56 extending from the top of the ball portion 48 to the end wall 54 having a diameter slightly larger than the diameter of the elongated shaft 38 and a second lower section 58 extending from the end wall 54 to the open end of the cylindrical collar 50 having a diameter larger than the diameter of the first upper section 56. The arm member 32 is received in the center bore 52 with the control knob against the outer surface of the ball portion 48 and the elongated shaft 38 extending through the upper 56 and lower 58 sections of the bore 52 with the groove 40 extending below or beyond the open end of the cylindrical collar 50.

A first biasing member 60, such as a coil spring, is seated in the second lower portion 58 of the center bore 52 between the end wall 54 and the pushnut 42 on the end of the shaft 38 for urging the arm member 32 from the actuation position to the rest position retracted in the recessed space 24.

The remote mirror adjustment mechanism 10 further includes a cylindrical housing 62 defining a cavity 64 for enclosing the ball socket 46 against the base member 18. The housing 62 has a first end defining an open end 66 which is attached to the second end of the base member 18 and a second end forming a bottom 68 for closing the cavity 64 around the concave socket 44 and the ball socket 46. The second end of the base member 18 includes a downwardly and outwardly projecting clip member 70 which is received though a side opening 72 in the housing 62 for locking and retaining the housing 62 to the base member 18. The concave socket portion 44 of the base member 18 is seated in the open end 66 of the housing 62. A slide ring 74, which is generally disc shaped, slidably supports the ball socket 46 in the cavity 64 of the housing 62. The slide ring 74 is seated around the cylindrical collar 50 and against the lower portion of the spherical ball portion 48. A second biasing member 76, such as a coil spring, is positioned within the cavity 64 between the slide ring 74 and the bottom 68 of the housing 62 for urging the ball socket 46 against the concave socket 44 of the base member 18. The slide ring 74 and bottom 68 of the housing 62 each include a groove 78, 80, respectively, for receiving and retaining the second biasing member 76 there between.

The ball socket 46 further includes a plurality of connectors 82 projecting outwardly from the surface of the spherical ball portion 48 for receiving a first end of a control mechanism 84. Each connector 82 extends through one of a plurality of windows 86 through the side wall of the housing 62. The control mechanism 84 in the preferred embodiment includes a pull-pull Bowden type cable having a first end connected to one of the connectors 82 and a second end connected to the vehicle side rear-view mirror 12. In the preferred embodiment there are three connectors 82 equally spaced about the spherical ball portion 48 and three respective cable control mechanisms 84 interconnected between the ball socket 46 and the side rear-view mirror 12 for adjusting the angular position of the mirror 12. As shown in FIG. 2, the housing 62 may also include plurality of cable stops 88 spaced below the connectors 82 for holding the cable casing in a fixed position with respect to the connectors 82 and guiding the cables 84 along the housing 62.

FIG. 4 shows an exploded view of the assembly for the remote mirror adjustment mechanism 10. The elongated arm 32 is received through the aperture 34 in the bottom surface 22 of the base member 18 and into the center bore 52 of the ball socket 46. The first biasing member, or spring, 60 and the push nut 42 retain the arm 32 within the bore 52 and urge the arm 32 to the rest position retracted in the recessed space 24. The ball socket 46 is seated against the concave socket 44 on the base member 18 and slidably supported by the slide ring 74. The second biasing member, or spring, 76 is positioned between the slide ring 74 and the bottom 68 of the housing 62 as the housing 62 is locked to the base member 18 by connection of the clip member 70 and opening 72. The second biasing member 76 provides resistance to the ball socket 46 by urging the ball socket 46 against the concave socket 44. The cable control mechanisms 84 may then be attached to the respective connectors 82 and cable stops 88 along the housing 62.

The remote mirror adjustment mechanism 10 may be secured to the interior panel 16 by inserting the housing 62 and lower portion or second end of the base member 18 through the opening 28 in the panel 16 until the lip 29 on the annular edge abuts the peripheral edge formed by the opening 28. The cable control mechanisms 84 are routed through the vehicle from the adjustment mechanism 10 to the side rear-view mirror 12.

In operation, to adjust the angular position of the side rear-view mirror 12, the vehicle operator pulls the control knob 36 on the elongated arm 32 from the rest position retracted in the recessed space 24 formed in the base member 18 to the actuation position with the arm 32, or control knob 36, extending outwardly from the recessed space 24 and beyond the annular edge 20 of the base member 18. The elongated arm 32 may then be pivoted around the center bore 52 whereby the elongated shaft 38 forces the ball socket 46 to rotate with respect to the concave socket 44. The rotation of the ball socket 46 changes the longitudinal length of the plurality of cable control mechanisms 84 extending between the ball socket 46 and the mirror 12 to manually adjust the angular position of the mirror 12. Once the mirror 12 is adjusted to the desire position, the control knob 36 may be released and the first biasing member, or spring, 60 returns the elongated arm 32 to the rest position retracted in the recessed space 24. When the elongated arm 32, and thus the control knob 36, are retracted in the space 24 in the rest position, the entire adjustment mechanism remains substantially flush with the interior panel 16 and is less susceptible to incidental missadjustment by the operator or other passenger. The second biasing member, or spring, 76 provides resistance between the ball socket 46 and the concave socket 44 to retain the ball socket 46 in the adjusted position once the arm 32 is retracted to the rest position. That is, the aperture 34 in the bottom surface 22 has a larger diameter than the elongated shaft 38 and substantially as large and the diameter of the control knob 36 and may be outwardly tapered to allow a large degree of pivotal rotation of the arm member 32. This allows the arm 32 to be retracted to the rest position within the recessed space 24 at various angles or positions without changing the adjusted position of the ball socket 46 or the angular position of the mirror 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A remote mirror adjustment mechanism for manually adjusting the position of a vehicle side rear-view mirror comprising:

a base member having first and second ends, said first end defining an annular edge portion adapted to engage and mount said adjustment mechanism to a substantially flat interior panel of a vehicle, and said second end defining a bottom surface with an aperture extending therethrough;

said first and second end portions of said base member forming a recessed space therebetween;

said second end portion of said base member forming a concave socket adjacent said aperture;

a rotatable ball socket member supported in said concave socket and including a center bore formed therethrough;

an elongated arm member with a portion thereof extending into said center bore and another portion extending through said aperture and into said recessed space, said arm member being moveable between: a first recessed rest position with said arm member within said recessed space and said center bore; and a second actuation ready position with a portion of said arm member extending outwardly from said recessed space and beyond said annular edge for readily adjusting the angular position of the arm member which corresponds to a desired position of the vehicle side rear-view mirror;

said center bore housing a yieldable biasing member to urge said arm member from said actuation ready position into said retracted rest position.

2. A remote mirror adjustment mechanism for manually adjusting the position of a vehicle side rear-view mirror comprising:

a base member having first and second ends, said first end defining an annular edge portion adapted to engage and mount said adjustment mechanism to a substantially flat interior panel of a vehicle, and said second end defining a bottom surface with an aperture extending therethrough;

said first and second end portions of said base member forming a recessed space therebetween;

said second end portion of said base member forming a concave socket adjacent said aperture;

a rotatable ball socket member supported in said concave socket and including a center bore formed therethrough;

a housing defining a cavity for enclosing said ball socket member and having a first end attached to said second end portion of said base member and a second end closing said cavity;

an annular slide ring slidably supporting said ball socket against said concave socket of said second end portion of said base member;

a yieldable biasing member seated between said slide ring and said second end of said housing to urge said ball socket against said concave socket of said base member;

said ball socket including a plurality of connectors for receiving a first end portion of a mirror position control mechanism;

said housing includes a plurality of windows for providing openings through said housing for passage of said connectors outside of said housing;

an elongated arm member with a portion thereof extending into said center bore and another portion extending through said aperture and into said recessed space, said arm member being moveable between: a first recessed rest position with said arm member within said recessed space and said center bore; and a second actuation ready position with a portion of said arm member extending outwardly from said recessed space and beyond said annular edge for readily adjusting the angular position of the arm member which corresponds to a desired position of the vehicle side rear-view mirror;

said center bore housing a second yieldable biasing member to urge said arm member from said actuation ready position into said retracted rest position.

3. A remote mirror adjustment mechanism as set forth in claim 2 wherein said control mechanism includes a cable having a first end connected to one of said connectors and a second end connected to the vehicle side rear-view mirror wherein movement of a connector causes corresponding movement of an associated cable which in turn moves the mirror.

* * * * *